United States Patent
Kakishima et al.

(10) Patent No.: US 12,058,664 B2
(45) Date of Patent: Aug. 6, 2024

(54) TERMINAL, RADIO COMMUNICATION METHOD, BASE STATION, AND SYSTEM USING MIMO LAYERS

(71) Applicant: NTT DOCOMO, INC., Tokyo (JP)

(72) Inventors: Yuichi Kakishima, Tokyo (JP); Yuki Matsumura, Tokyo (JP); Hideaki Takahashi, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 525 days.

(21) Appl. No.: 17/282,260

(22) PCT Filed: Oct. 5, 2018

(86) PCT No.: PCT/JP2018/037488
§ 371 (c)(1),
(2) Date: Apr. 1, 2021

(87) PCT Pub. No.: WO2020/070898
PCT Pub. Date: Apr. 9, 2020

(65) Prior Publication Data
US 2021/0345315 A1 Nov. 4, 2021

(51) Int. Cl.
*H04W 72/044* (2023.01)
*H04W 8/24* (2009.01)
*H04W 72/23* (2023.01)

(52) U.S. Cl.
CPC ........... *H04W 72/046* (2013.01); *H04W 8/24* (2013.01); *H04W 72/23* (2023.01)

(58) Field of Classification Search
None
See application file for complete search history.

(56) References Cited

U.S. PATENT DOCUMENTS

| 2011/0281600 A1 | 11/2011 | Tanaka |
| 2013/0095816 A1 | 4/2013 | Gerstenberger et al. |

(Continued)

FOREIGN PATENT DOCUMENTS

| JP | 2010-177975 A | 8/2010 |
| JP | 2017-038379 A | 2/2017 |
| WO | 2018069257 A1 | 4/2018 |

OTHER PUBLICATIONS

Office Action issued in Japanese Application No. 2020-551067, dated Jan. 17, 2023 (6 pages).

(Continued)

*Primary Examiner* — Anh Ngoc M Nguyen
(74) *Attorney, Agent, or Firm* — Osha Bergman Watanabe & Burton LLP

(57) ABSTRACT

Provided are a user terminal, a radio base station, and a radio communication method that are capable of performing reception processing using the number of suitable MIMO layers for a downlink. The user terminal includes a reception section that receives a downlink signal from the radio base station. Furthermore, the user terminal includes a control section that assumes the maximum number of MIMO layers based on control information that is included in the downlink signal. In a case where the downlink signal includes first control information indicating the number of MIMO layers, the control section assumes the maximum number of MIMO layers based on the first control information.

6 Claims, 4 Drawing Sheets

(56) References Cited

U.S. PATENT DOCUMENTS

2018/0041981 A1* 2/2018 Wu .................. H04W 72/51
2020/0100178 A1* 3/2020 Kim .................. H04W 72/23

OTHER PUBLICATIONS

Office Action issued in Chinese Application No. 201880098460.9, dated May 6, 2023 (8 pages).
Extended European Search Report issued in European Application No. 18936039.9, dated Apr. 28, 2022 (8 pages).
Office Action issued in Japanese Application No. 2020-551067; Dated Aug. 2, 2022 (6 pages).
International Search Report issued in PCT/JP2018/037488 mailed on Jan. 8, 2019 (5 pages).
Written Opinion of the International Searching Authority issued in PCT/JP2018/037488 mailed on Jan. 8, 2019 (4 pages).
MediaTek Inc.; "MIMO layer configuration"; 3GPP TSG-RAN WG2 #103bis, R2-1813713; Chengdu, China, Oct. 8-12, 2018 (4 pages).
MediaTek Inc.; "MIMO layer configuration"; 3GPP TSG-RAN WG2 #103bis, R2-1813714; Chengdu, China, Oct. 8-12, 2018 (8 pages).
Office Action issued in Chinese Application No. 201880098460.9; Dated Oct. 28, 2023 (15 pages).
Office Action issued in Japanese Application No. 2020-551067; Dated Nov. 14, 2023 (20 pages).
Office Action issued in counterpart European Patent Application No. 18 936 039.9 mailed on Apr. 4, 2024 (8 pages).

* cited by examiner

TERMINAL, RADIO COMMUNICATION METHOD, BASE STATION, AND SYSTEM USING MIMO LAYERS

TECHNICAL FIELD

The present disclosure relates to a user terminal, a radio base station, and a radio communication method.

BACKGROUND ART

In the Universal Mobile Telecommunication System (UMTS) network, Long Term Evolution (LTE) is specified for the purpose of higher speed data rite and low latency, and the like. Furthermore, a system that is a successor to LTE has also been under study for the purpose of broader bandwidth and higher speed than in LTE. Examples of the system that is a successor to LTE include LTE-Advanced (LTE-A), Future Radio Access (FRA), 5th generation mobile communication system (5G), 5G plus (5G+), Radio Access Technology (New-RAT), New Radio (NR), and the like.

In New Radio (NR), in order to accomplish further speed up of signal transfer and a reduction in interference, massive Multiple Input Multiple Output (MIMO) transfer that uses many antenna elements (for example, 100 or more elements) in a high frequency band (for example, 5 GHz or higher) is performed. The MEMO transfer is multilayer transfer that uses precoding and the precoding is based on a codebook. In New Radio (NR), up to a maximum of eight layers are supported and up to a maximum of two codewords that are elements of the precoding are supported.

In New Radio (NR), a user terminal (User Equipment (UE)) reports the maximum number of MIMO layers (the number of antennas is 2, 4, or 8) using FeatureSetDownlinkPerCC that is signaling indicating the capability of the UE, and a radio base station (also referred to a network (NW) determines the number of ranks for the user terminal and the number of codewords and notifies of the number (1 or 2) of codewords using maxNrofCodeWordsScheduledByDCI of RRC (refer to NPL 1).

CITATION LIST

Non-Patent Literature

NPL 1
R2-1813713 3GPP TSG-RAN WG2 #103bis Chengdu, China 8-12 Oct. 2018

SUMMARY OF INVENTION

Technical Problem

The radio base station needs to determine the maximum number of MIMO layers that are used for actual communication and to share the maximum number of MIMO layers between the radio base station and the user terminal.

However, a method of determining or assuming the maximum number of MIMO layers in the user terminal has not been stipulated up to now.

If the user terminal cannot share the maximum number of suitable MIMO layers with the radio base station, reception that corresponds to the number layers that is greater than the number of layers which are used for actual communication has to be assumed and there is a concern that there will be a need to ensure unnecessary resource for arithmetic operation.

An object of the present disclosure is to provide a user terminal, a radio base station, and a radio communication method that are capable of performing reception processing using the number of suitable MIMO layers for a downlink. In the same manner, if the maximum number of suitable MIMO layers cannot be shared with the user terminal, this is different the assumption by the radio base station and there is a concern that MIMO transfer of the number of higher layers will not be performed.

Solution to Problem

A user terminal according to one aspect of the present disclosure includes: a reception section that receives a downlink signal from a radio base station; and a control section that assumes the maximum number of MIMO layers based on control information which is included in the downlink signal.

A radio base station according to one aspect of the present disclosure includes: a reception section that receives an uplink signal from a user terminal; a control section that determines the number of code words and the maximum number of MIMO links based on control information that is included in the uplink signal; and a transmission section that transmits a downlink signal which includes control information indicating the number of MIMO layers, to the user terminal.

A radio communication method according to one aspect of the present disclosure includes: receiving a downlink signal from a radio base station; and assuming the maximum number of MIMO layers based on control information that is included in the downlink signal.

Advantageous Effects of Invention

According to the present disclosure, a user terminal can perform reception processing using the number of suitable MIMO layers for a downlink.

DESCRIPTION OF EMBODIMENTS

An embodiment in the present disclosure below will be described below with reference to the drawings.

Embodiment

First, a radio communication system according to the present embodiment will be described.

Figure 1:
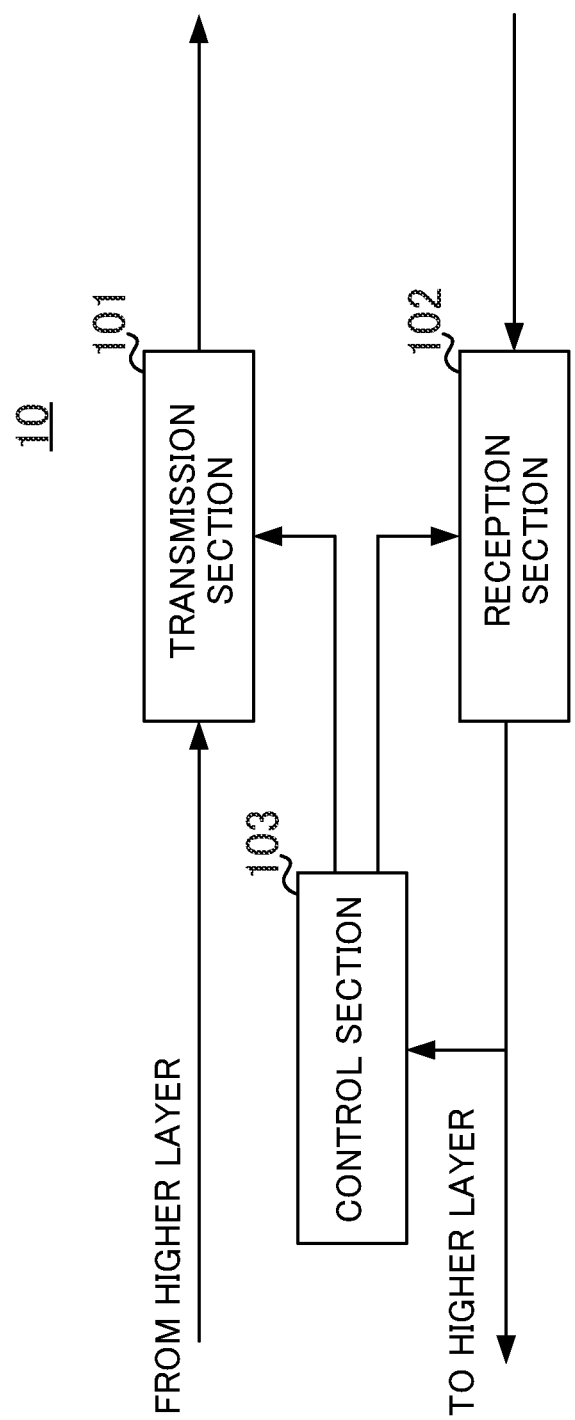
FIG. 1 is a block diagram illustrating an example of a configuration of a radio base station according to an embodiment.
Figure 2:
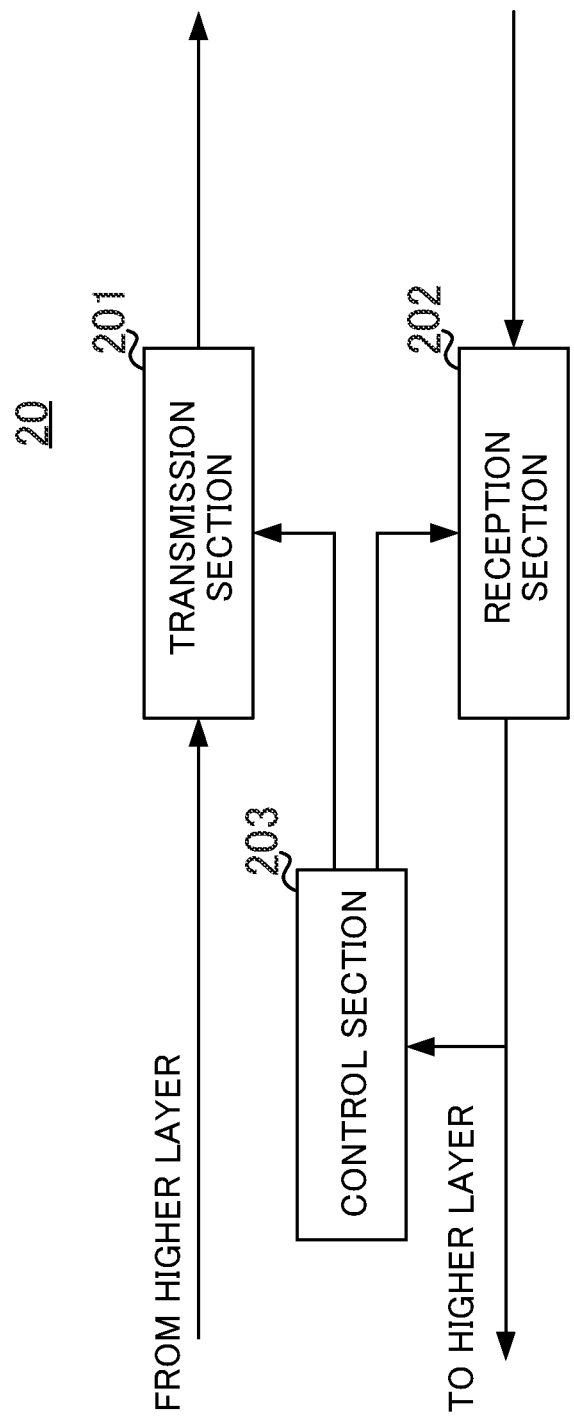
FIG. 2 is a block diagram illustrating an example of a configuration of a user terminal according to an embodiment.

The radio communication system according to the present embodiment includes radio base station 10 (for example, also referred to as an NWNetwork, an eNodeB (eNB), or a gNodeB (gNB)) that is illustrated in FIG. 1, and user terminal 20 (for example, also referred to as UE) that is illustrated in FIG. 2. User terminal 20 has a radio connection (radio access) to radio base station 10. It is noted that, in the following, in some cases, radio base station 10 is expressed NW 10 for short.

It is noted that configurations of radio base station 10 and user terminal 20 that will be described below represents an example of a function according to the present embodiment. Radio base station 10 and user terminal 20 may have a function that is not illustrated. Furthermore, in the case of a function of performing an operation according to the present embodiment, a function category and/or a name of a functional section are not limited.

FIG. 1 is a block diagram illustrating an example of a configuration of radio base station 10 according to the present embodiment. Radio base station 10 includes transmission section 101, reception section 102, and control section 103.

Transmission section 101 generates various physical layer signals from a higher layer signal, and performs processing that transmits the generated signal (a downlink signal) to user terminal 20. For example, under the control of control section 103, transmission section 101 transmits the downlink signal. For example, maxNrofCodeWordsScheduledByDCI may be included in the downlink signal.

Reception section 102 receives a signal (an uplink signal) from user terminal 20 and performs processing that acquires the higher layer signal from the received physical layer uplink signal.

Control section 103 performs control of transmission processing in transmission section 101 and control of reception processing in reception section 102. For example, control unit 103 determines the number of MIMO layers that are used for a downlink for every user terminal 20 and controls transmission section 101 in such a manner that information indicating the number of MIMO layers is transmitted.

FIG. 2 is a block diagram illustrating a configuration of user terminal 20 according to the present embodiment. User terminal 20 includes transmission section 201, reception section 202, and control section 203.

Transmission section 201 generates various physical layer signals from a higher layer signal and performs processing that transmits the generated uplink signal to radio base station 10. For example, under the control of control session 203, transmission section 201 transmits the uplink signal. For example, FeatureSetDownlinkPerCC may be included in the uplink signal.

Reception section 202 receives a downlink signal from radio base station 10 and performs processing that acquires a higher layer signal from the received physical layer downlink signal.

Control section 203 performs control of the transmission processing in transmission section 201 and control of the reception processing in reception section 202. For example, control section 203 performs detection processing of the number of MIMO layers and, based on a result of the detection processing of the number of MIMO layers, controls the reception processing in reception section 202.

Next, a method of notifying of the number of MIMO layers according to the present embodiment will be described.

First Example

In a first example, a case is described where radio base station 10 explicitly notifies the number of MIMO layers.

Figure 3:
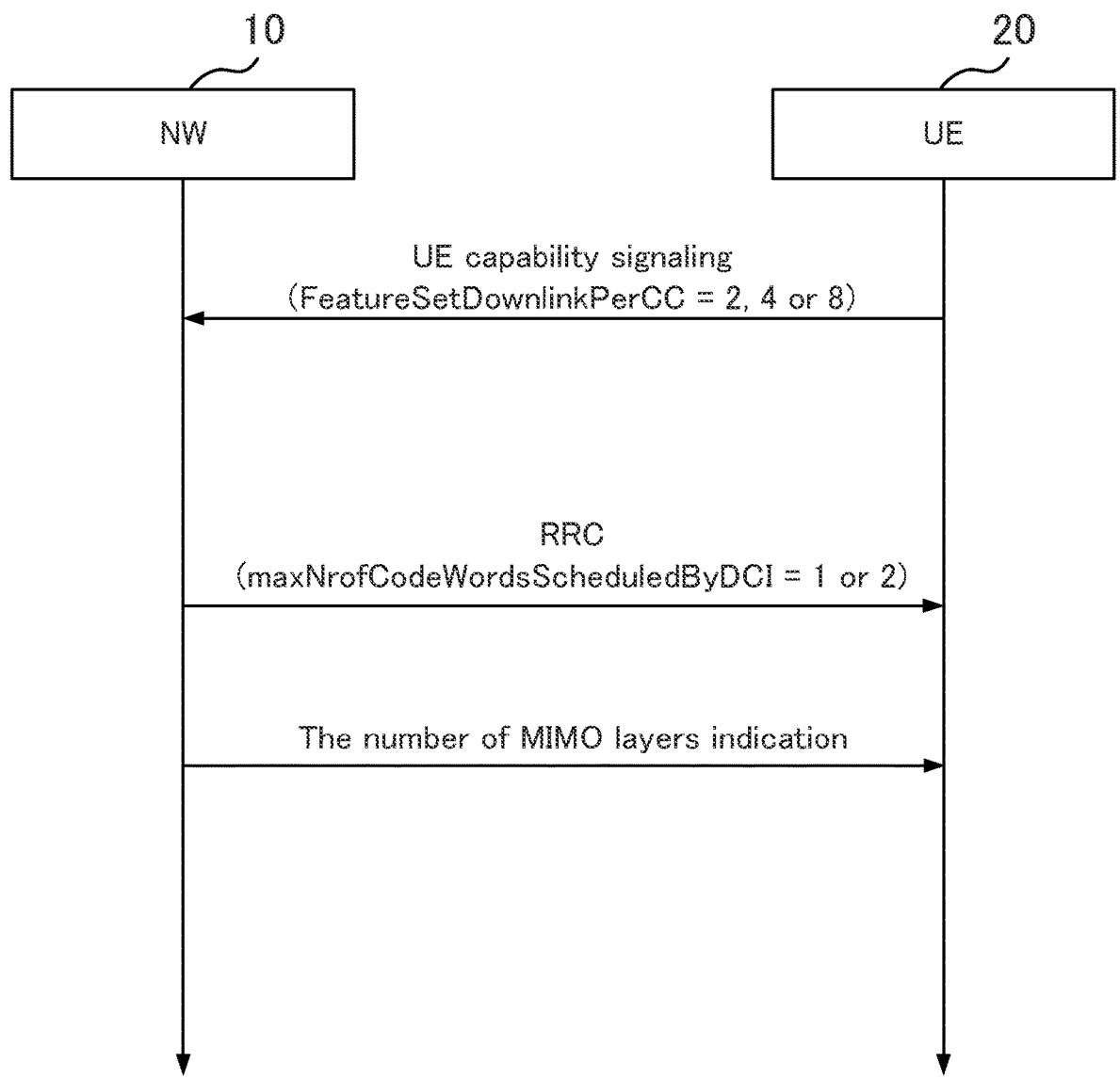
FIG. 3 is a diagram illustrating a first example of a method of notifying of the number of MIMO layers according to an embodiment.

FIG. 3 is a diagram illustrating the first example of the method of notifying of the number of MIMO layers according to the present embodiment.

As illustrated in FIG. 3, with FeatureSetDownlinkPerCC that is signaling indicating the capability of user terminal 20 (UE capability signaling), user terminal 20 reports the maximum number of MIMO layers (the number of antennas is 2, 4, or 8) to radio base station 10.

Radio base station 10 deter s the number of ranks, the number of codewords, and the maximum number of MIMO layers for user terminal 20. Then, with maxNrofCodeWordsScheduledByDCI of the RRC, radio base station 10 notifies user terminal 20 of the number (1 or 2) of codewords. Moreover, with the number of MIMO layers indication, radio base station 10 explicitly notifies user terminal 20 of the maximum number of MIMO layers at a fine level of granularity.

Accordingly, user terminal 20 can assume in a qualified manner the maximum number of MIMO layers that are actually used for the downlink. Therefore, user terminal 20 can perform the reception processing with the suitable number of MIMO layers for the downlink and can suppress the occurrence of unnecessary arithmetic operation.

It is noted that, in the present example, instead of notifying the maximum number of MIMO layers, radio base station 10 may notify of a MIMO layer that is supported. For example, radio base station 10 may notify of the availability or non-availability of support of each of the ranks (1 to 8). In so doing, the notification may be provided in a bitmap format (8-bit information).

Furthermore, in the present example, the number of MIMO layers indication described above may be stipulated in a manner that replaces maxNrofCodeWordsScheduledByDCI. In this case, user terminal 20 may compute the maximum number of codewords based on the maximum number of AMMO layers. For example, user terminal 20 may assume that, in a case where the maximum number of MIMO layers is equal to or greater than 5, the maximum number of codewords is 2 and may assume that, in a case where the maximum number of MIMO layers is equal to or smaller than 4, the maximum number of codewords is 1.

Second Example

In a second example, a case is described where user terminal 20 assumes the maximum number of MIMO layers based on the capability of user terminal 20, which is signaled.

In this case, user terminal 20 does not assume the number of layers that is greater than the capability of user terminal 20 which is signaled. For example, in a case where 2 is reported with FeatureSetDownlinkPerCC (a second higher layer parameters, although 1 is received with maxNrofCodeWordsScheduledByDCI, user terminal 20 assumes that the maximum number of MIND layers is 2.

Accordingly, the same effect as in the first example can be obtained.

Third Example

In a third example, a case is described where user terminal 20 assumes the maximum number of MIMO layers based on any other downlink information such as CodebookConfig (first configuration information).

In this case, user terminal 20, for example, may assume the maximum number of MIMO layers based on parameters N1 and N2 (for example, the number N1 of antenna ports in the vertical direction and the number N2 of antenna ports) that are arranged two-dimensionally in CodebookConfig. Specifically, user terminal 20 may assume that the number of MIMO layers is 2*N1*N2 (2 is the number of polarized waves).

Alternatively, in a case where multiple codewords are configured, user terminal 20 may assume the maximum number of MIMO layers based on the codeword that uses the maximum number of antenna ports, of the multiple codewords.

Alternatively, user terminal 20 may assume the maximum number of MIME) layers based on CodebookSubsetRestriction (a first higher layer parameter). For example, user terminal 20 may assume the maximum number of MIMO layers based on the maximum number of layers in a Rank Indicator (RI) or Precoding Matrix Indicator (PMI) that is activated in CodebookSubsetRestriction.

Accordingly, the same effect as in the first example can be obtained.

Fourth Example

In a fourth example, a case is described where user terminal 20 assumed the maximum number of MIMO layers based on a CSI-RS configuration (second configuration information).

In this case, for example, user terminal 20 assumes that the number of antenna ports for a Channel State Information Reference Signal (CSI-RS) (a prescribed reference signal) that is configured is the maximum number of MIMO layers.

Furthermore, in a case where multiple CSI-RSs are configured, user terminal 20 assumes the maximum number of MIMO layers based on a maximum value of the CSI-RS that is among the multiple CSI-RSs.

Accordingly, the same effect as in the first example can be obtained.

Fifth Example

In a fifth example, a case is described where user terminal 20 assumes the maximum number of MIMO layers based on maxNrofCodeWordsScheduledByDCI that is notified by the radio base station.

In this case, regarding maxNrofCodeWordsScheduledByDCI, user terminal 20 may assume that, if the number of codewords is 1, the maximum number of MIMO layers (the maximum number of ranks) is 4 and may assume that, if the number of codewords is 2, the maximum number of MIMO layers (the maximum number of ranks) is 8.

Furthermore, user terminal 20 may assume the maximum number of MIMO layers based on information of a Demodulation Reference Signal (DM-RS) that is configured. For example, user terminal 20 may assume that, in a case where the notification is provided in such a manner that the DM-RS having the maximum number of codewords that is 1 is applied, the maximum number of layers is 4 and may assume that, in a case where the notification is provided in such a manner that the DM-RS having the maximum number of codewords that is 2 is applied, the maximum number of layers is 8.

It is noted that a name of a parameter that is used in the above description is an example and that a different name may be used.

The embodiment of the present disclosure is described above.

<Hardware Configuration>

It is noted that the block diagram that is referred to for the description of the embodiment illustrates blocks on a per-function basis. These functional blocks (constituent sections) are realized by an arbitrary combination of at least pieces of hardware or pieces of software. Furthermore, a method of realizing each functional block is not particularly limited. That is, each functional block may be realized using one apparatus that results from physical or logical coupling, and may be realized by making a connection to two or more apparatuses that are separated physically or logically, in a direct or direct manner (for example, such as in a wired or wireless manner) and using these multiple apparatuses. The functional block may be realized by combining the one or more apparatuses, which are described above, and a piece of software.

The functions include determining !deciding!, judging, calculating, computing, processing, deriving, investigating, looking-up, ascertaining, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like, and are not limited to these. For example, a functional block (a constituent section) that causes a transmission function to be performed is referred to a transmission section (a transmitting unit) or a transmitter. Any one of the functional blocks is as described above, and a method of realizing a function block is not particularly limited.

Figure 4:
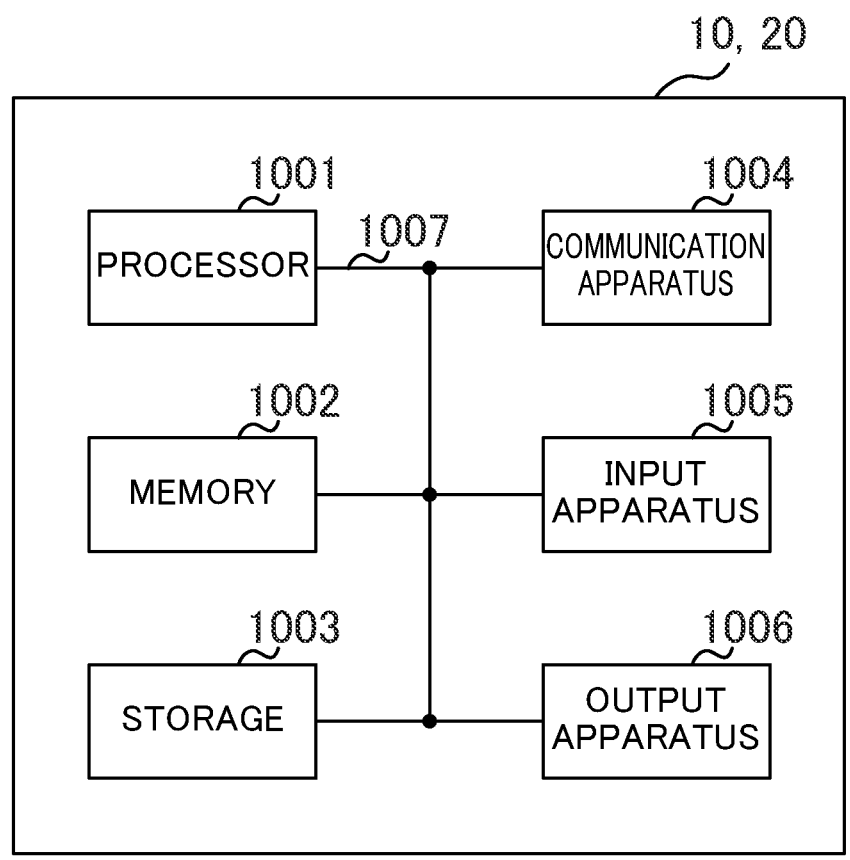
FIG. 4 is a diagram illustrating an example of a hardware configuration of the radio base station and the user terminal in the present disclosure.

For example, a base station, a user terminal, and the like according to an embodiment in the present disclosure may function as a computer that performs processing for a radio communication method in the present disclosure. FIG. 4 is a diagram illustrating an example of a hardware configuration of a base station and a user terminal according to an embodiment in the present disclosure. Radio base station 10 and user terminal 20, which are described above, may be physically configured as a computer apparatus that includes processor 1001, memory 1002, storage 1003, communication apparatus 1004, input apparatus 1005, output apparatus 1006, bus 1007, and the like.

It is noted that, in the following description, the term apparatus can be replaced with a circuit, a device, a unit, or the like. Hardware configurations of radio base station 10 and user terminal 20 may be employed in such a manner that one or more apparatuses that are illustrated are included, and may be configured without including one or several of the apparatuses.

A prescribed piece of software a program) is read to be loaded onto a piece of hardware such as processor 1001, memory 1002, or the like, and thus processor 1001 performs an arithmetic operation, thereby controlling communication by communication apparatus 1004 or controlling at least one of reading and writing of data from and to memory 1002 and storage 1003. When this is done, a function of each of radio base station 10 and user terminal 20 is realized.

Processor 1001, for example, causes an operating system to operate and thus controls an entire computer. Processor 1001 may be configured with a central processing apparatus (a central processing unit (CPU)) that includes an interface with a peripheral apparatus, a control apparatus, an arithmetic operation apparatus, a register, and the like. For example, control section 103 and control section 203, which are described above, and the like may be realized by processor 1001.

Furthermore, processor 1001 reads a program (a program code), a software module, data, and the like from at least one of storage 1003 and communication apparatus 1004 into memory 1002, and performs various processing operations according to these. As the program, a program is used that causes the computer to perform at least one or several of the operations in the embodiment described above. For example, control section 103 of radio base station 10 and/or control section 203 of user terminal 20 may be realized by a control program that is stored in memory 1002 and operates in processor 1001, and may also be realized in the same manner for any other functional block. The various processing operations described above are described as being performed by one processor 1001, but may be performed by two or more processors 1001 at the same time or sequentially. Processor 1001 may be integrated into one or more chips. It is noted that the program may be transmitted from a network over an electric telecommunication line.

Memory 1002 is a computer-readable recording medium, and, for example, may be configured with at least one of a Read Only Memory (ROM), an Erasable Programmable ROM (EPROM), an Electrically Erasable Programmable ROM (EEPROM), a Random Access Memory (RAM), and the like. Memory 1002 may be referred to a register, a cache, a main memory (a main storage apparatus), or the like. A program (a program code), a software module, or the like that is executable in order to perform the radio communication method according to the embodiment in the present disclosure can be retained in memory 1002.

Storage 1003 is a computer-readable recording medium, and, for example, may be configured with at least one of an optical disk such as a Compact Disc Rom (CD-ROM), a hard disk drive, a flexible disk, a magneto-optical disk (for example, a compact disk, a digital versatile disk, a Blu-ray (a registered trademark) disk), a smart card, a flash memory (for example, a card, a stick, or a key drive), a floppy (a registered trademark) disk, a magnetic strip, and the like. Storage 1003 may be referred to as an auxiliary storage apparatus. The storage medium described above, for example, may be a database or a server that includes at least one of memory 1002 and storage 1003, or any other suitable medium.

Communication apparatus 1004 is hardware (a transmission and reception device) for performing communication between radio base station or user terminal, and a computer through at least one of a wired network and a wireless network, and, for example, is also referred to as a network device, a network controller, a network card, a communication module, or the like. Communication apparatus 1004, for example, may be configured to include a high frequency switch, a duplexer, a filter, a frequency synthesizer, and the like in order to realize at least one of Frequency Division Duplex (FDD) and Time Division Duplex (TDD). For example, transmission section 101, reception section 102, transmission section 201, and reception section 202, which are described, and the like may be realized by communication apparatus 1004.

Input apparatus 1005 is an input apparatus (for example, a keyboard, a mouse, a microphone, a switch, a button, a sensor, or the like) that receives input from the outside. Output apparatus 1006 is an output apparatus (for example, a display, a speaker, an LED lamp, or the like) that performs output to the outside. It is noted that input apparatus 1005 and output apparatus 1006 may be configured to be integrated into one piece (for example, a touch panel).

Furthermore, apparatuses, such as processor 1001, memory 1002, are connected to bus 1007 for communicating information. Bus 1007 may be configured using a single bus and may be configured using a bus that differs from one apparatus to another.

Furthermore, each of radio base station 10 and user terminal 20 may be configured to include pieces of hardware, such as a microprocessor, a Digital Signal Processor (DSP), an Application Specific Integrated Circuit (ASIC), a Programmable Logic Device (PLD), and a Field Programmable Gate Array (FPGA). One or several of, or all of functional blocks of each of radio base station 10 and user terminal 20 may be realized using the hardware. For example, processor 1001 may be integrated into at least one of these pieces of hardware.

(Information Notification and Signaling)

information notification is not limited to the aspect and the embodiment, which are described in the present disclosure, and may be performed using any other method. For example, the information notification may be performed with Physical Layer Signaling (for example, Downlink Control Information (DCI), Uplink Control Information (UCI)), Higher Layer Signaling (for example, Radio Resource Control (RRC) Signaling, Medium Access Control (MAC) Signaling, report information (a Master Information Block (MIB)), a System Information Block (SIB)), any other signal, or a combination of these. Furthermore, the RRC signaling may be referred to as an RRC message, and, for example, may be an RRC Connection Setup Message, an RRC Connection Reconfiguration Message, or the like, (Application System)

Each of the aspects and embodiments, which are described in the present disclosure, may find application in at least one of Long Term Evolution. (LTE), LTE-Advanced (LTE-A), SUPER 3G, IMT-Advanced, a 4th generation mobile communication system (4G), a 5th generation mobile communication system (5G), Future Radio Access (FRA), new Radio (NR), W-CDMA (a registered trademark), GSM (a registered trademark), CDMA 2000 Ultra Mobile Broadband (UMB), IEEE 802.11 (Wi-Fi) (a registered trademark)), IEEE 802A6 (WiMAX) (a registered trademark)), IEEE 802.20, Ultra-WideBand (UWB), Bluetooth (a registered trademark), any other system that uses a suitable system, and a next-generation system that results from the expansion which is based on these furthermore, application in a combination of multiple systems (for example, a combination of at least one of LTE and LTE-A and 5G, or the like) may be possible.

(Processing Procedure and Others)

In a processing procedure, a sequence, a flowchart, and the like according to each of the aspects and the embodiment, which are described in the present disclosure, the order may be changed as long as there is no conflict. For example, various step elements of the method that is described in the present disclosure are presented in the exemplary order and is not limited to the presented specific order.

(Operation by the Base Station)

In some cases, a specific operation as performed by the base station in the present disclosure is performed by a higher node (an upper node) that is at a higher level than the base station, depending on the situation. It is apparent that, in a network that is lade up of one or more network nodes each of which has a base station, various operations that are performed for communication with a terminal can be performed two by at least one of the base station and a network node (for example, an MME, an S-GW, or the like is considered, but no limitation to these is imposed) other than the base station. In the above description, the case where one network node other than the base station is provided is given as an example, but a combination of other multiple network nodes (for example, an MME and an S-GW) may be provided.

(Input And Output Direction)

Information (refer to the subtitle "Information And Signal") or the like can be output from a higher layer (or a lower layer) to the lower layer (or the higher layer). The information or the like may be input and output through multiple network nodes.

(Handing the Information And the like that Are Input And Output)

The information and the like that are input and output may be retained in a specific place (for example, a memory) and may be managed using a management table. The information and the like that are input and output can be overwritten, updated, or added. The information and the like that are output may be deleted. The information and the like that are input may be transmitted to any other apparatus.

(Judging Method)

Judging may be performed with a value (0 or 1) that is represented by one bit, may be performed with a Boolean value (true or false), and may be performed with comparison of numerical values (for example, comparison with a prescribed value).

(Software)

Software is referred to as software, firmware, middleware, a microcode, or hardware description language, but, regardless of whether or not any other terms are available, can be broadly interpreted to mean a command, an instruction set, a code, a code segment, a program code, a program, a subprogram, a software module an application, a software application, a software package, a routine, a subroutine, an object, an executable file, an execution file, a procedure, a function or the like.

Furthermore, the software, the command, the information, and the like may be transmitted and received through a transfer medium. For example, in a case where the software is transmitted from a website, a server, or any other remote source using at least one of a cable technology (a coaxial cable, optical fiber, a twisted pair, a Digital Subscriber Line (DSL), or the like) and a radio technology, at least one of the cable technology and the radio technology (an infrared ray, a microwave, or the like) falls with the definition of the transfer medium.

(Information and Signal)

The information and the signal, which are described in the present disclosure, and the like may be represented using any one of various different technologies. For example, data that can be referred to throughout the above description, an instruction, a command, information, a signal, a bit, a symbol, a chip, and the like may be represented by voltage, current, an electromagnetic wave, a magnetic field or a magnetic particle, a photo field or a photo, or an arbitrary combination of these.

It is noted that the terms which are described in the present disclosure and the terms which are necessary for an understanding of the present disclosure may be replaced with the terms that have the same or similar meaning. For example, at least one of a channel and a symbol may be a signal (signaling). Furthermore, the signal may be a message. Furthermore, a Component Carrier (CC) may be referred to as a carrier frequency, a cell, a frequency carrier, or the like.

("System" and "Network")

The terms "system" and "network" that are used in the present disclosure are interchangeably used.

(Names of a Parameter And a Channel)

Furthermore, the information and the parameter, which are described in the present disclosure, and the like may be represented by an absolute value, may be represented using a relative value from a prescribed value, and may be represented using separate corresponding information. For example, a radio resource may be indicated by an index.

A name that is used for the parameter described above is also not a limited name in any respect. Moreover, in some cases, an equation or the like that use these parameters are different from those that are explicitly disclosed in the present disclosure. Various channels (for example, a PUCCH, a PDCCH, and the like) and information elements an be identified with all suitable names. Because of this various names that are allocated to these various channels and information elements are not limited names in any respect.

(Base Station (Radio Base Station))

In the present disclosure, the terms "base station (BS)", radio base station", "fixed station", "NodeB", "eNodeb (eNB)", "gNodeB (gNB)", "access point", "transmission point", "reception point", "transmission/reception point" "cell", "sector", "cell group", "carrier", and "component carrier", and the like can be interchangeably used. In some cases, the terms "macrocell", "small cell", and "femtocell" are used to refer to the base station.

The base station can accommodate one or more (for example, three) cells. In a case where the base station accommodates multiple cells, an entire coverage area that is covered by the base station can be divided into multiple smaller areas. In each of the smaller cells, a communication service can be provided by a base station subsystem (for example, indoors small-sized base station (Remote Radio Head (RRH))). The term "cell" or "sector" refers to one or several portions or all portions of a coverage area that is covered by at least one of a base station and a base station subsystem that perform the communication service in this coverage.

(Terminal)

In the present disclosure, the terms "mobile station (MS)", "user terminal", "user equipment (UE)", and "terminal", and the like can be interchangeably used.

In some cases, a person of ordinary skill in the art refers to the mobile station as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, or a client, or using several other suitable terms.

(Base Station And Mobile Station)

At least one of the base station and the mobile station may be referred to as a transmission apparatus, a reception apparatus, a communication apparatus, or the like. It is noted that at least one of the base station and the mobile station may be a device that is mounted into a mobile body or the mobile body itself. The mobile body may be a vehicle (for example, an automobile or an airplane), may be an unmanned mobile body (for example, a drone, an autonomous vehicle, or the like), and may be a robot (a manned-type or unmanned-type robot). It is noted that at least one of the base station and the mobile station also includes an apparatus that does not necessarily move at the time of communication operation. For example, at least one of the base station and the mobile station may be Internet-of-Things (IoT) equipment such as a sensor.

Furthermore, the base station in the present disclosure may be replaced with the user terminal. For example, each of the aspects and the embodiment in the present disclosure may find application in a configuration that results from replaying communication between the base station and the user terminal with communication (which, for example, may be referred to as device-to-device (D2D), vehicle-to-everything (V2X), or the like) between each of the multiple user terminals. In this case, user terminal 20 may be configured to have the function that base station 10 described above has. Furthermore, the terms "uplink" and "downlink" may be replaced with the expression (for example, "side") that corresponds to inter-terminal communication. For example, an uplink channel, a downlink channel, and the like may be replaced with a side channel.

In the same manner, the user terminal in the present disclosure may be replaced with the base station. In this case, base station 10 is configured to have the function that user terminal 20 described above has.

(Meaning And Interpretation of a Term)

In some cases, the meaning of the terms "determining" and "determining" are broadened to include various operations. Regarding "determining" and "deciding", for example, a thing that is judged, calculated, computed, processed, derived, investigated, looked up (search or inquiry) (for example, as looked up in a table, a database, or a separate data structure), and ascertained can be inclusively considered as a thing that is determined or decided. Furthermore, regarding to "determining" and "deciding", a thing that is received (for example, as information is received), transmitted (for example, as information is transmitted), input, output, or accessed (for example, as data in a memory is accessed) can be inclusively considered as a thing that is determined or "decided". Furthermore, regarding to "determining" and "deciding", a thing that is resolved, selected, chosen, established, compared, or so on can be inclusively considered as a thing that is "determined" or "decided". More precisely, regarding to "determining" and "deciding", a thing on which any operation is performed can be inclusively considered as a thing that is "determined" or "decided". Furthermore, "determining (deciding)" may be replaced with "assuming", "expecting", "considering", or the like.

The expressions "connected" and "coupled" or all variants of the expressions can mean all direct or indirect connection and coupling between two or more elements, and can imply the presence of one or more intermediate elements between two elements that are "connected" or "coupled" to each other. The connection and the coupling between elements may be made physically, may be made logically, or may be made both physically and logically. For example, "connection" may be replaced with "access". In the case of the use in the present disclosure, it is considered that two elements are "connected" or "coupled" to each other using at least one of one or more electric wires, a cable, and a printed electric connection, and an electromagnetic energy or the like that has a wavelength in a radio frequency domain, a microwave region, and a light (both visible light and invisible light) region, as several non-limiting and non-inclusive examples.

A reference signal can also be referred to as a Reference Signal (RS), and, according to standards that are applied, may be referred to a pilot.

Unless otherwise specified, the expression "based on" that is used in the present disclosure does not mean "based only on". In other words, the description "based on" means both "based only on" and based at least on".

Any reference to elements that use the terms "first" and "second" rid the like that are used in the present disclosure does not generally limit a quantity of and the order of these elements. The terms can be used, as a method of distinguishing between two or more elements, in the present disclosure. Therefore, reference to first and second elements does not mean that only two elements are employed, or that the first element has to precede the second element in any form.

"Means" in a configuration of each of the apparatuses described above may be replaced with "section", "circuit" "device", or the like.

In the present disclosure, in a case where "include", "including" and variants of these are used, these terms are intended to have a broad meaning in the same manner as the term "comprising". Moreover, the term "or" that is used in the present disclosure is intended not to be exclusive OR.

The radio frame may be configured with one or more frames in a time domain. Each of the one or more frames in the time domain may be referred to as a subframe. The subframe may be configured with one or more slots in the time domain. The subframe may be a fixed time length (for example, 1 ms) that does not depend on numerology.

The numerology may be a communication parameter that is applied to at least one of transmission and reception of a certain signal or channel. The numerology, for example, indicates at least one of Subcarrier Spacing (SCS), a bandwidth, a symbol length, a cyclic prefix length. Transmission Time Interval (TTI), the number of symbols per TTI, a radio frame configuration, specific filtering processing that is performed by a transmission and reception apparatus in a frequency domain, specific windowing processing that is performed by the transmission and reception apparatus in the time domain, and the like.

The slot is configured with one or more symbols (an Orthogonal Frequency Division Multiplexing (OFDM) symbol, a Single Carrier Frequency Division Multiple Access (SC-FDMA) symbol, or the like) in the time domain. The slot may be a time unit that is based on the numerology.

The slot may include multiple mini-slots. Each of the mini-slots may be configured with one or more symbols in the time domain. Furthermore, the mini-slot may be referred to as a subslot. The mini-slot may be configured with a smaller number of symbols than the slots A PDSCH (or a PUSCH) that is transmitted in the time unit that is greater than the mini-slot may be referred to as a PDSCH (or a PUSCH) mapping type A. The PDSCH (or the PUSCH) that is transmitted using the mini-slot may be referred to as a PDSCH (or a PUSCH) mapping type B.

Any one of the radio frame, the subframe, the slot, the mini-slot, and the symbol represents the time unit when transferring a signal. A separate name that corresponds to each of the radio frame, the subframe, the slot, the mini-slot, and the symbol may be used.

For example, one subframe may be referred to as a Transmission Time Interval (TTI), multiple contiguous subframes may be referred to as a TTI, and one slot or one mini-slot may be referred to as a TTI. More precisely, at least one of the subframe and the TTI may be a subframe (1 ms) in the existing LTE, may be a duration (for example, 1 to 13 symbols) that is shorter 1 ms, and may be a duration that is longer than 1 ms. It is noted that a unit that represents the TTI may be referred to a slot, a mini-slot, or the like instead of a subframe.

At this point, TTI, for example, refers to a minimum time unit for scheduling in radio communication. For example, in an LTE system, the base station performs scheduling for allocating a radio resource (a frequency bandwidth, a transmit power, or the like that is used in each user terminal) in a TTI unit to each user terminal. It is noted that the definition of the TTI is not limited to this.

The TTI may be a transmission time unit, such as a data packet (a transport block) that is channel-coded, a code block, or a codeword, and may be a processing unit, such as scheduling or a link adaptation. It is noted that, when the TTI is assigned, a time section (for example, the number of symbols) to which the transport block, the code block, the codeword, or the like is actually mapped may be shorter than the TTI.

It is noted that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that makes up the minimum time unit for the scheduling may be controlled.

A TTI that has a time length of 1 ms may be referred to as a usual TTI (a TTI in LTE Rel.8-12), a normal TTI, a long TTI, a usual subframe, a normal subframe, a long subframe, a slot, or the like. A TTI that is shorter than the usual TTI may be referred to as a shortened TTI, a short TTI, a partial TTI (a fractional TTI), a shortened subframe, a short subframe, a mini-slot, a subslot, a slot, or the like.

It is noted that the long TTI (for example, the usual TTI, the subframe, or the like) may be replaced with the TTI that has a time length which exceeds 1 ms, and the short TTI (for example, the shortened TTI or the like) may be replaced with a TTI that has will length which is less than a TTI length of the long TTI and is equal to or longer than 1 ms.

A resource block (RB) is a resource allocation unit in the time domain and the frequency domain, and may include one or more contiguous subcarriers in the frequency domain. The number of subcarriers that are included in the RB may be the same regardless of the numerology, and, for example, may be 12. The number of subcarriers that are included in the RB may be determined based on the numerology.

Furthermore, the time domain of the RB may include one or more symbols and may have a length of one slot, one mini-slot, one subframe or one TTI. One TTI, one subframe, and the like each may be configured with one or more resource blocks.

It is noted that one or more RBs may be referred to as a Physical Resource Block (PRB), a Sub-carrier Group (SCG), a Resource Element Group (REG), a PRB pair, an RB pair, or the like.

Furthermore, the resource block may be configured with one or more Resource Elements (REs). For example, one RE may be a radio resource region that is one subcarrier and one symbol.

A bandwidth part (BWP) (which may be referred to as a partial bandwidth or the like) may represent a subset of contiguous common resource blocks (RB) for certain numerology in a certain carrier. At this point, the common RB may be specified with an RB index that uses a common reference point of the carrier as a reference. The PRBs may be defined with a certain BWP and may be numbered within the BWP.

A UL BWP and a DL BWP may be included in the BWP. For the UE, one or more BWPs may be set to be within one carrier.

At least one of the BWPs that are set may be active, and it may not be assumed that the UE transmits and receives a prescribed signal or channel outside of the BWP that is active. It is noted that, in the present disclosure, "cell", "carrier", and the like may be replaced with "BWP".

Structures of the radio frame, the subframe, the slot, the mini-slot, the symbol, and the like are only described as examples. For example, the number of subframes that are included in the radio frame, the number of slots per subframe or radio frame, the number of mini-slots that are included within the slot, the numbers of symbols and RBs that are included in the slot or the mini-slot, the number of subcarriers that are included in the RB, the number of symbols within the TTI, the symbol length, the Cyclic Prefix (CP) length, and the like can be configured to be variously changed.

The "maximum transmit power" described in the present disclosure may mean a maximum value of the transmit power, may mean the nominal UE maximum transmit power, and may mean the rated UE maximum transmit power.

In the present disclosure, for example, in a case where articles, such as a, an and the in English, are added during translation, a noun that follows these articles may have the same meaning as when used in the plural.

In the present disclosure, the expression "A and B are different" may mean that "A and B are different from each other". It is noted that the expression may mean that "A and B are different from C". The expressions "separated" and "coupled" may also be interpreted in the same manner as the expression "A and B are different".

(Variation of the Aspect)

The aspects and the embodiments in the present disclosure may be used individually, may be used in combination and may be used in a switching manner depending on implementation. Furthermore, notification (for example, notification that "X is present") is not limited to being explicitly performed, and may be performed implicitly (for example, notification of prescribed information is not performed).

The detailed description is provided above in the present disclosure, and it is apparent that the present disclosure is not limited to the embodiment that is described in the present disclosure. An amendment and an alteration to the present disclosure can be made without departing from the gist and scope of the present disclosure that s defined by claims. Therefore, the description in the present disclosure is for the purpose of providing exemplary description and does not impose any limitation in meaning to the present disclosure.

INDUSTRIAL APPLICABILITY

An aspect of the present disclosure is useful for a radio communication system.

REFERENCE SIGNS LIST

10 Radio base station
20 User terminal
101,201 Transmission section
102,202 Reception section
103, 203 Control section

The invention claimed is:

1. A terminal, comprising:
   a transmitter that transmits UE capability signaling indicating a maximum number of MIMO layers supported by the terminal; and
   a receiver that receives a higher layer parameter indicating a maximum number of MIMO layers used for a downlink,
   wherein the higher layer parameter has more selectable values than the UE capability signaling, and wherein the UE capability signaling is any value of 2, 4, and 8, and the higher layer parameter is an integer value of 1 to 8.

2. The terminal according to claim 1, wherein the higher layer parameter is an integer value corresponding to the maximum number of MIMO layers used for the downlink.

3. The terminal according to claim 1, further comprising: a processor that assumes the maximum number of MIMO layers for the downlink based on the higher layer parameter.

4. A radio communication method, comprising:
transmitting, by a terminal, UE capability signaling indicating a maximum number of MIMO layers supported by the terminal; and
receiving, by the terminal, a higher layer parameter indicating a maximum number of MIMO layers used for a downlink,
wherein the higher layer parameter has more selectable values than the UE capability signaling, and
wherein the UE capability signaling is any value of 2, 4, and 8, and the higher layer parameter is an integer value of 1 to 8.

5. A base station, comprising:
a receiver that receives UE capability signaling indicating a maximum number of MIMO layers supported by a terminal; and
a transmitter that transmits a higher layer parameter indicating a maximum number of MIMO layers used for a downlink,
wherein the higher layer parameter has more selectable values than the UE capability signaling, and
wherein the UE capability signaling is any value of 2, 4, and 8, and the higher layer parameter is an integer value of 1 to 8.

6. A system including a terminal and a base station, wherein
the terminal includes:
a first transmitter that transmits UE capability signaling indicating a maximum number of MIMO layers supported by the terminal; and
a first receiver that receives a higher layer parameter indicating a maximum number of MIMO layers used for a downlink, and wherein
the base station includes:
a second receiver that receives the UE capability signaling; and
a second transmitter that transmits the higher layer parameter,
wherein the higher layer parameter has more selectable values than the UE capability signaling, and
wherein the UE capability signaling is any value of 2, 4, and 8, and the higher layer parameter is an integer value of 1 to 8.

* * * * *